United States Patent
Uno et al.

(10) Patent No.: US 10,771,164 B2
(45) Date of Patent: Sep. 8, 2020

(54) COMMUNICATION UNIT AND COMMUNICATION SYSTEM

(71) Applicants: Sony Corporation, Tokyo (JP); Sony Mobile Communications Inc., Tokyo (JP)

(72) Inventors: Masahiro Uno, Tokyo (JP); Yoshihito Ishibashi, Tokyo (JP)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 0 days.

(21) Appl. No.: 16/077,635

(22) PCT Filed: Feb. 8, 2017

(86) PCT No.: PCT/JP2017/004493
§ 371 (c)(1),
(2) Date: Aug. 13, 2018

(87) PCT Pub. No.: WO2017/169146
PCT Pub. Date: Oct. 5, 2017

(65) Prior Publication Data
US 2019/0052371 A1    Feb. 14, 2019

(30) Foreign Application Priority Data
Mar. 31, 2016   (JP) .................. 2016-070487

(51) Int. Cl.
*H04B 13/00* (2006.01)

(52) U.S. Cl.
CPC .................. *H04B 13/005* (2013.01)

(58) Field of Classification Search
CPC combination set(s) only.
See application file for complete search history.

(56) References Cited

U.S. PATENT DOCUMENTS

| 10,009,069 B2 * | 6/2018 | Kerselaers ............... H04B 5/02 |
| 2006/0077616 A1 * | 4/2006 | Takiguchi ............... A61L 15/60 |
|  |  | 361/231 |

(Continued)

FOREIGN PATENT DOCUMENTS

| JP | 2010-161531 A | 7/2010 |
| JP | 2010161531 A * | 7/2010 |

(Continued)

OTHER PUBLICATIONS

Sasaki, Aiichiro; JP-2010161531-A Publication (Year: 2010).*
Extended European Search Report dated Mar. 22, 2019 for corresponding European Application No. 17773694.9.

*Primary Examiner* — Yuwen Pan
*Assistant Examiner* — Erica L Fleming-Hall
(74) *Attorney, Agent, or Firm* — Michael Best & Friedrich LLP

(57) ABSTRACT

A communication unit of the disclosure includes a human-body electrode and a space electrode that perform communication through a human body by means of an electric field method, and a first auxiliary conductor section that includes a first end and a second end, the first end causing electrostatic induction corresponding to a transmission signal with respect to the human body, the second end being disposed at a position closer to the human-body electrode than to the space electrode.

17 Claims, 12 Drawing Sheets

(56) References Cited

U.S. PATENT DOCUMENTS

| | | | | |
|---|---|---|---|---|
| 2006/0158820 A1* | 7/2006 | Takiguchi | .......... | G07C 9/00087 361/231 |
| 2006/0184211 A1* | 8/2006 | Gaunt | .................. | A61B 5/0028 607/48 |
| 2007/0050199 A1* | 3/2007 | Ishibashi | ................ | G06Q 10/02 705/5 |
| 2009/0325485 A1* | 12/2009 | Hasegawa | ............ | H04B 13/005 455/41.1 |
| 2011/0169506 A1* | 7/2011 | Aubauer | ................ | F24C 7/082 324/633 |
| 2012/0032778 A1* | 2/2012 | Nakano | .............. | G07C 9/00087 340/5.52 |
| 2014/0080429 A1* | 3/2014 | Ohishi | ................ | H04B 13/005 455/90.2 |
| 2016/0028493 A1* | 1/2016 | Ohishi | ................ | H04B 13/005 455/41.2 |
| 2018/0287717 A1* | 10/2018 | Fukuda | ................ | H04B 13/005 |
| 2019/0165870 A1* | 5/2019 | Uno | ........................ | H01Q 1/24 |

FOREIGN PATENT DOCUMENTS

| | | | |
|---|---|---|---|
| JP | 2012-70043 A | 4/2012 |
| JP | 2012-90075 A | 5/2012 |
| JP | 2012-235092 A | 11/2012 |
| JP | 2012-235221 A | 11/2012 |

\* cited by examiner

[FIG. 1]
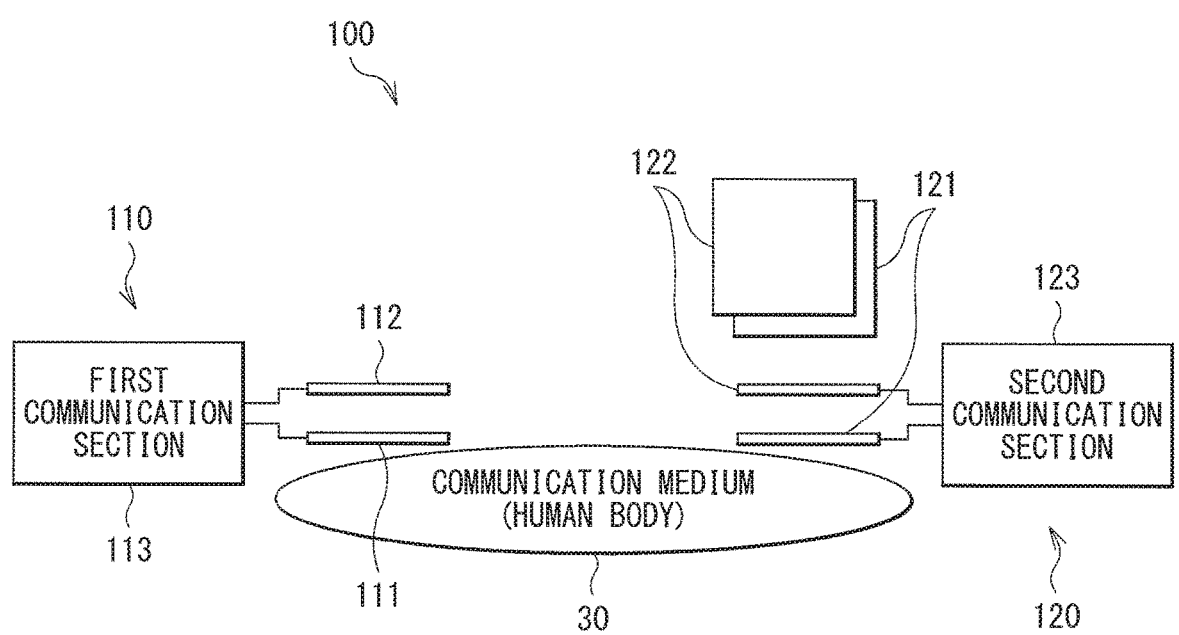

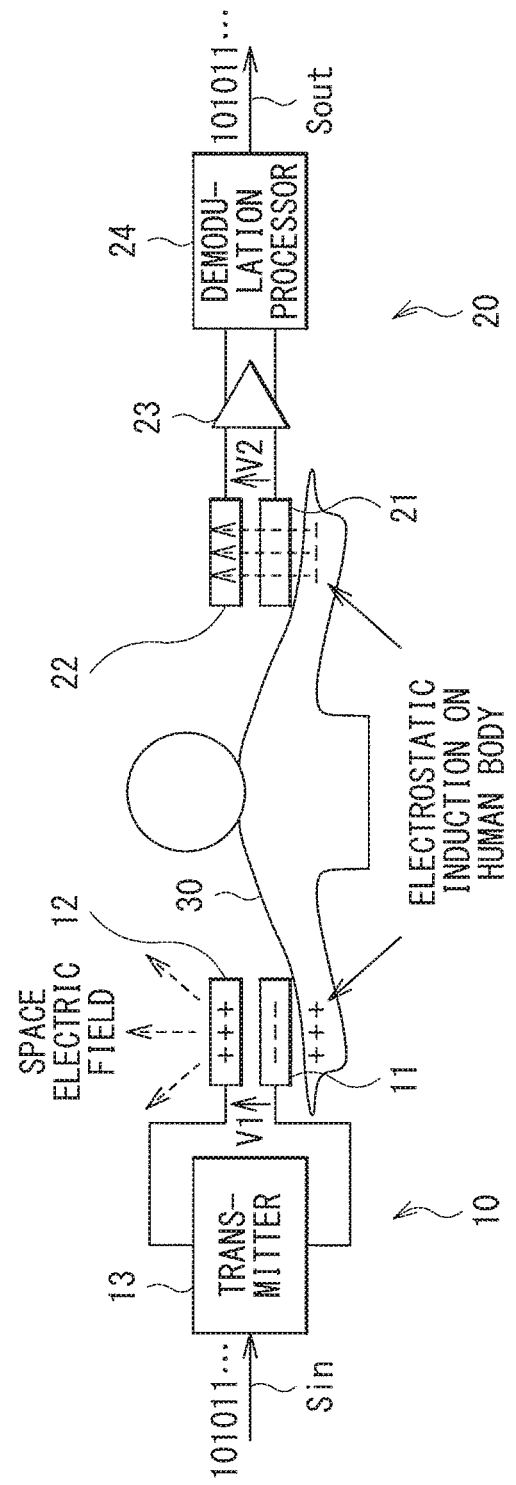
[FIG. 2]

[ FIG. 3 ]
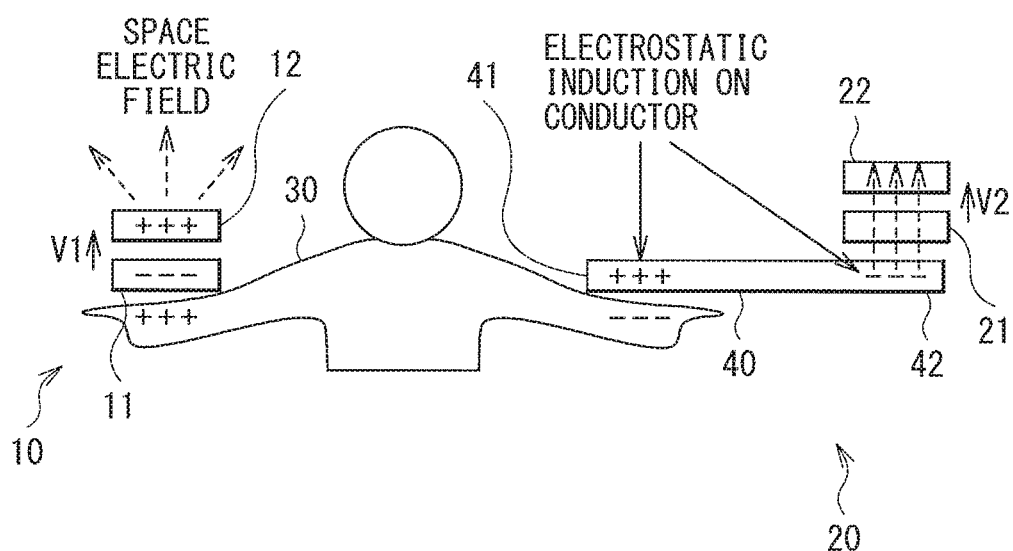
[ FIG. 4 ]
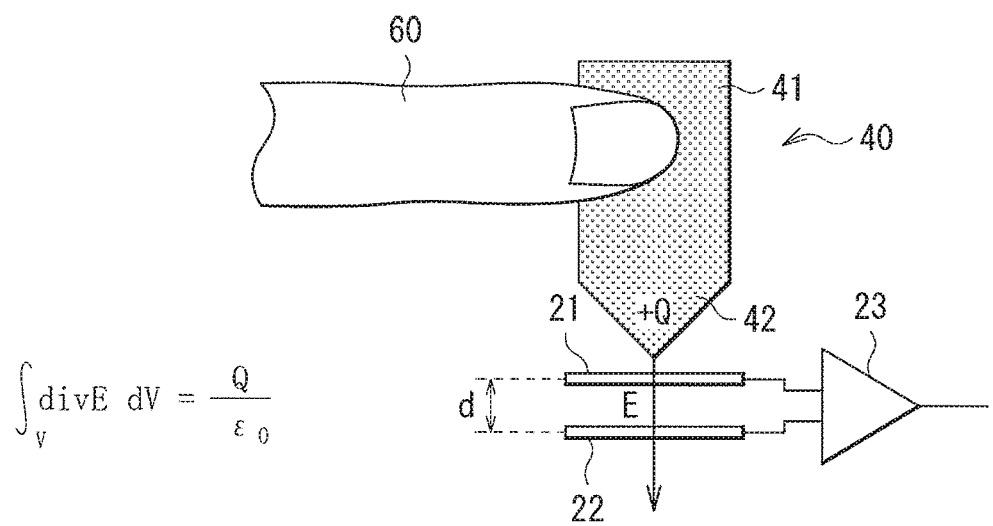

[ FIG. 5 ]
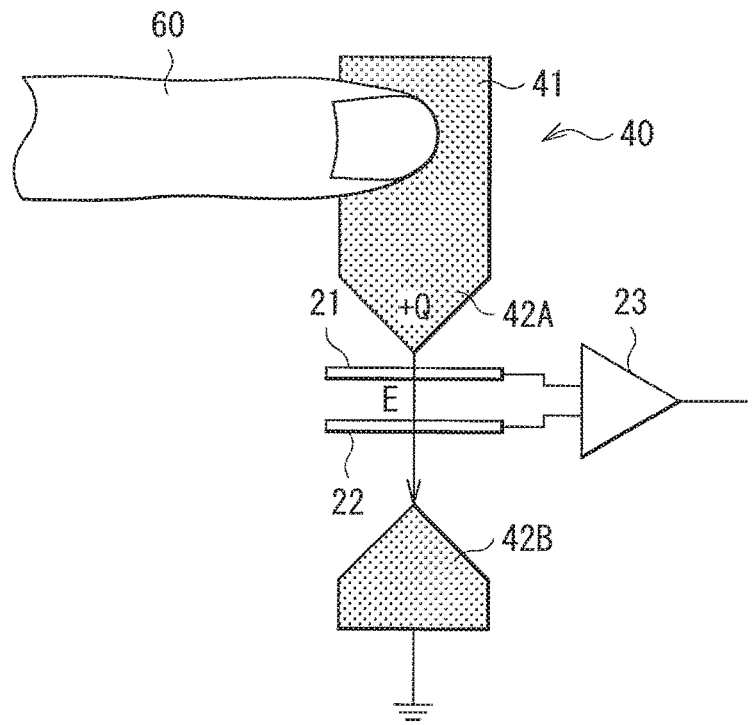
[ FIG. 6 ]
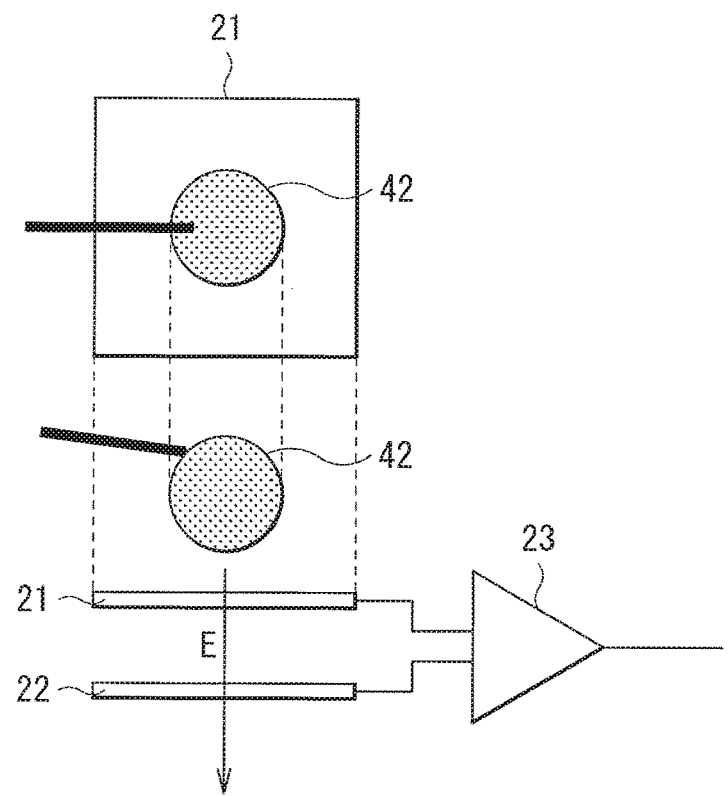

[ FIG. 7 ]
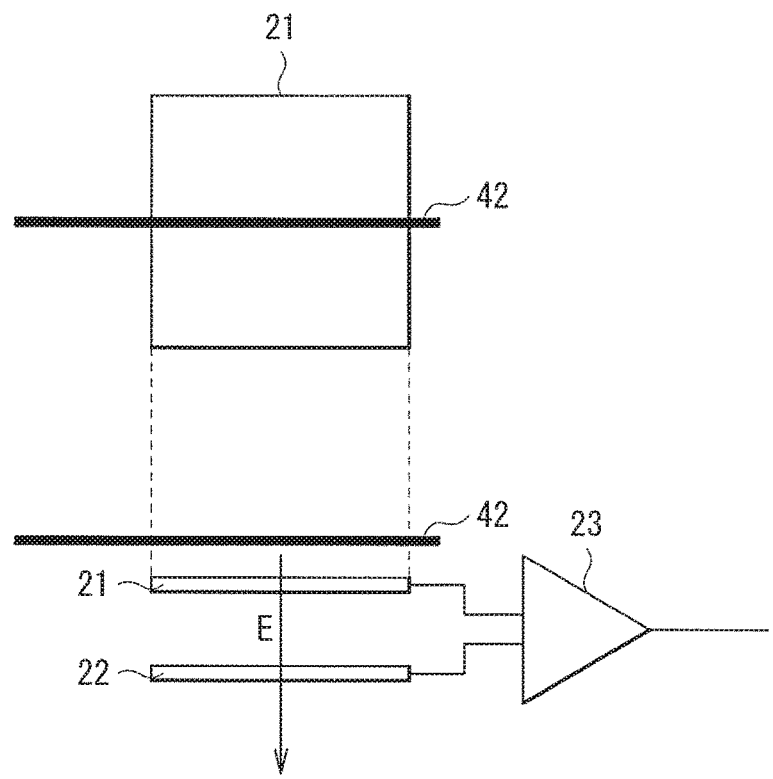
[ FIG. 8 ]
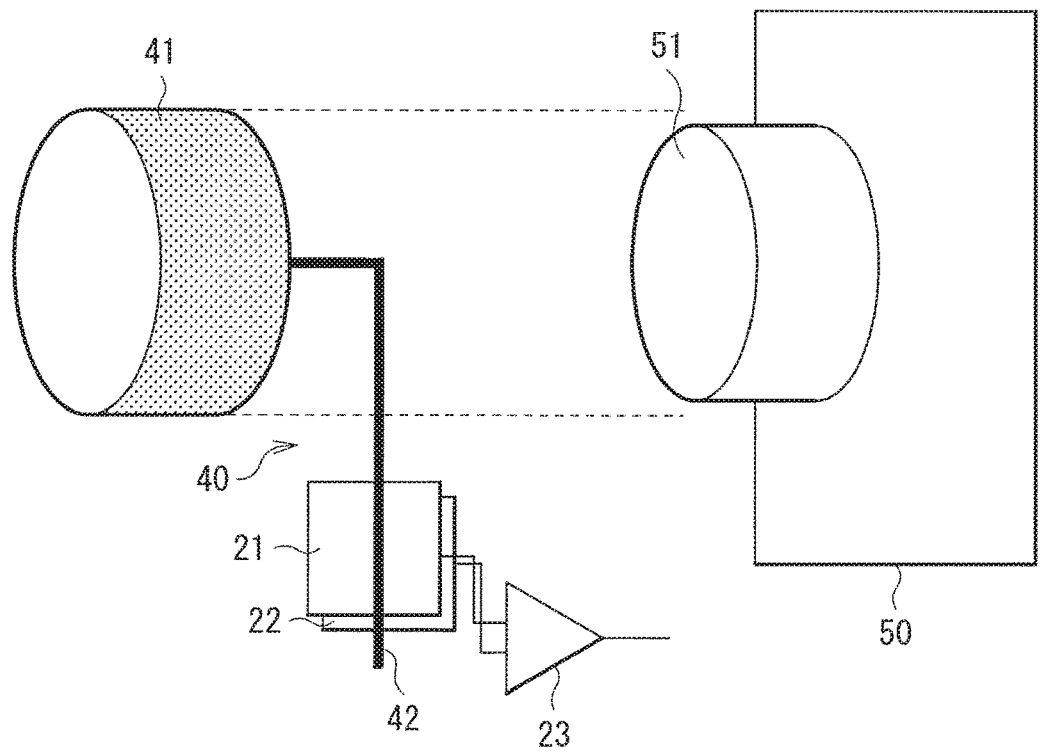

[ FIG. 9 ]
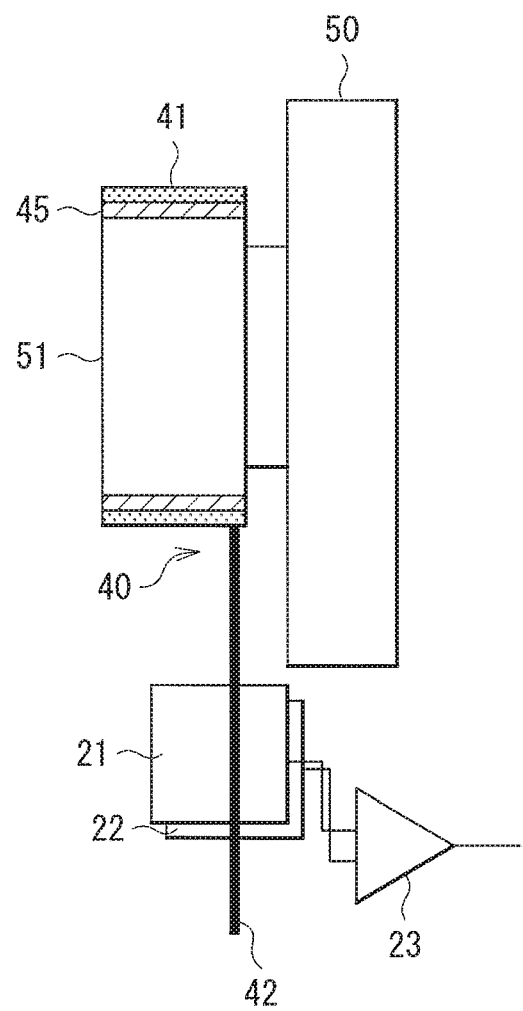

[FIG. 10]
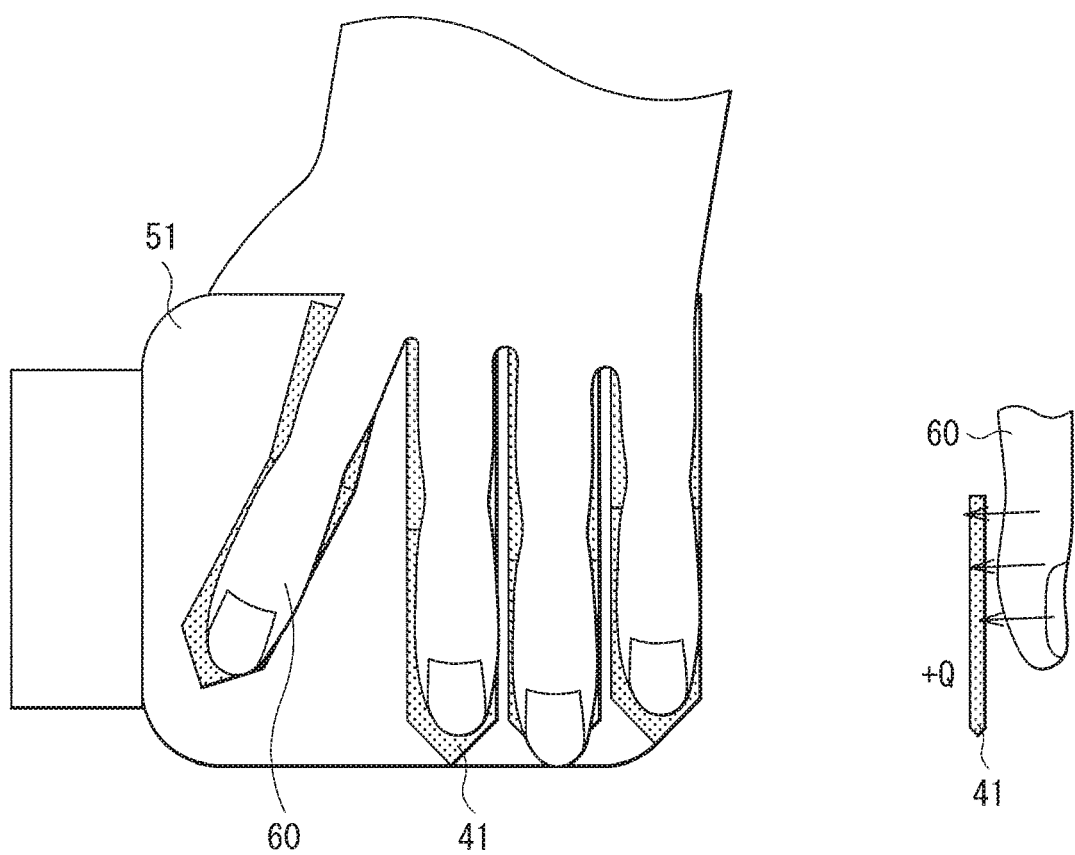

[FIG. 11]
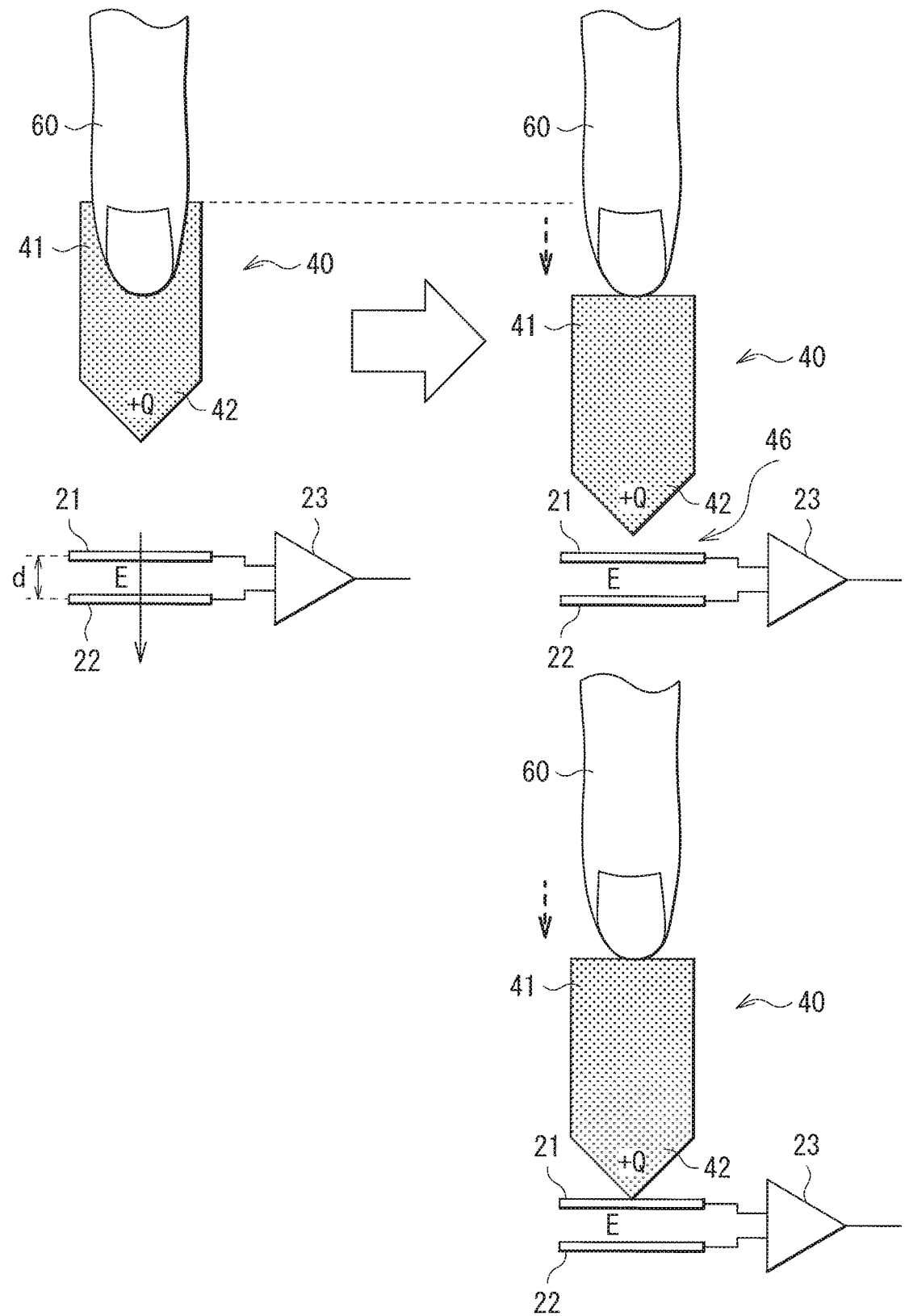

[ FIG. 12 ]
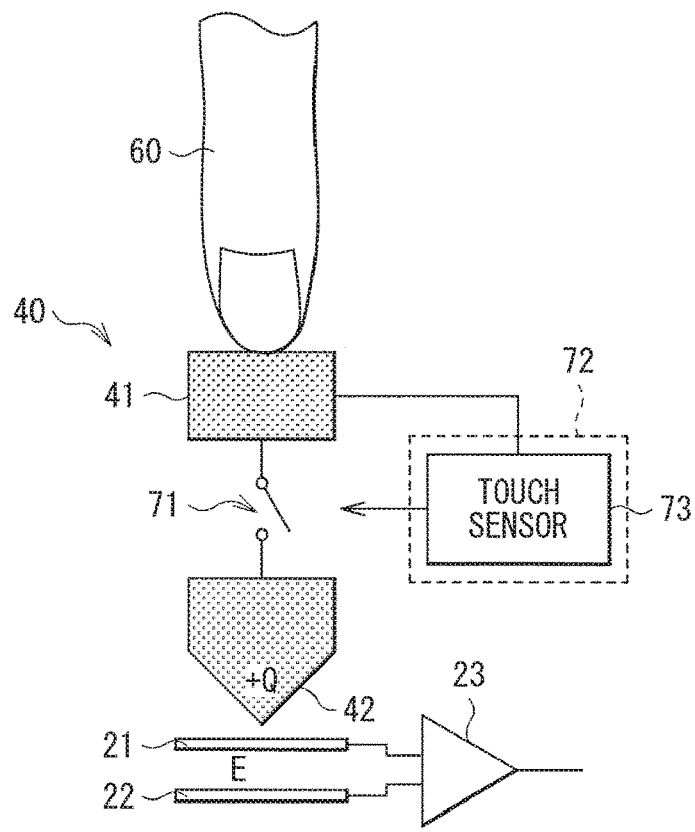
[ FIG. 13 ]
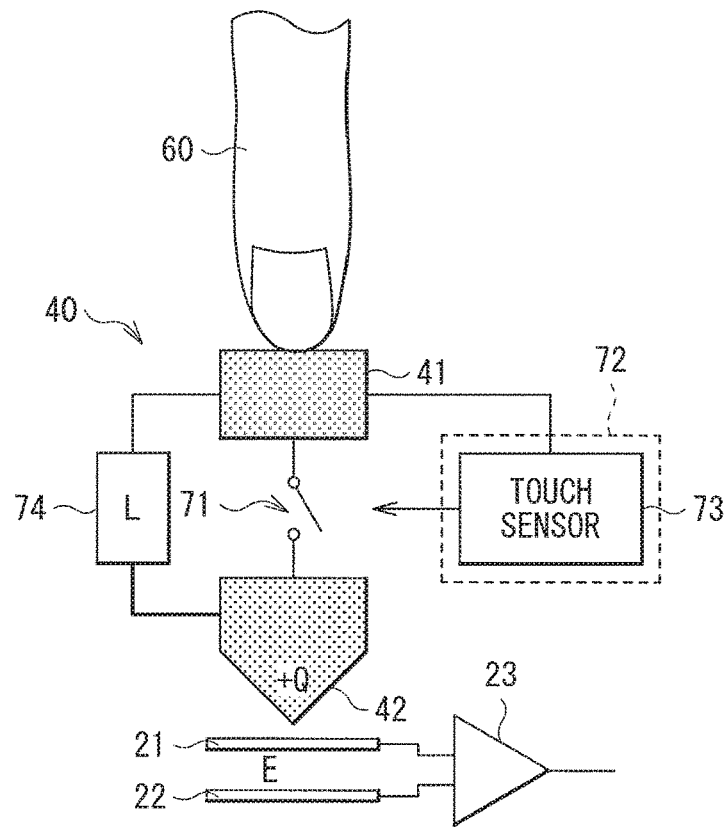

[ FIG. 14 ]
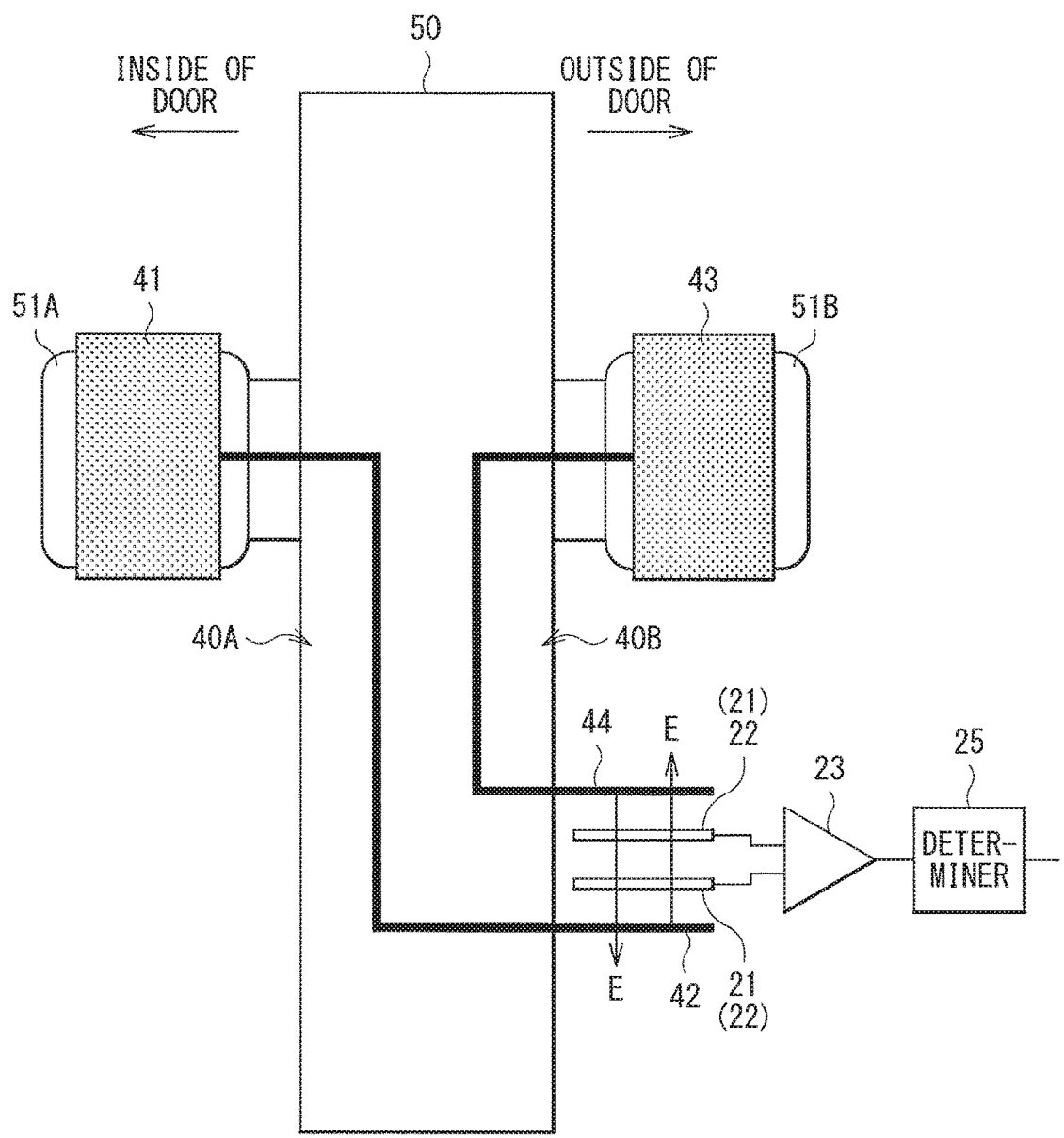

[FIG. 15]
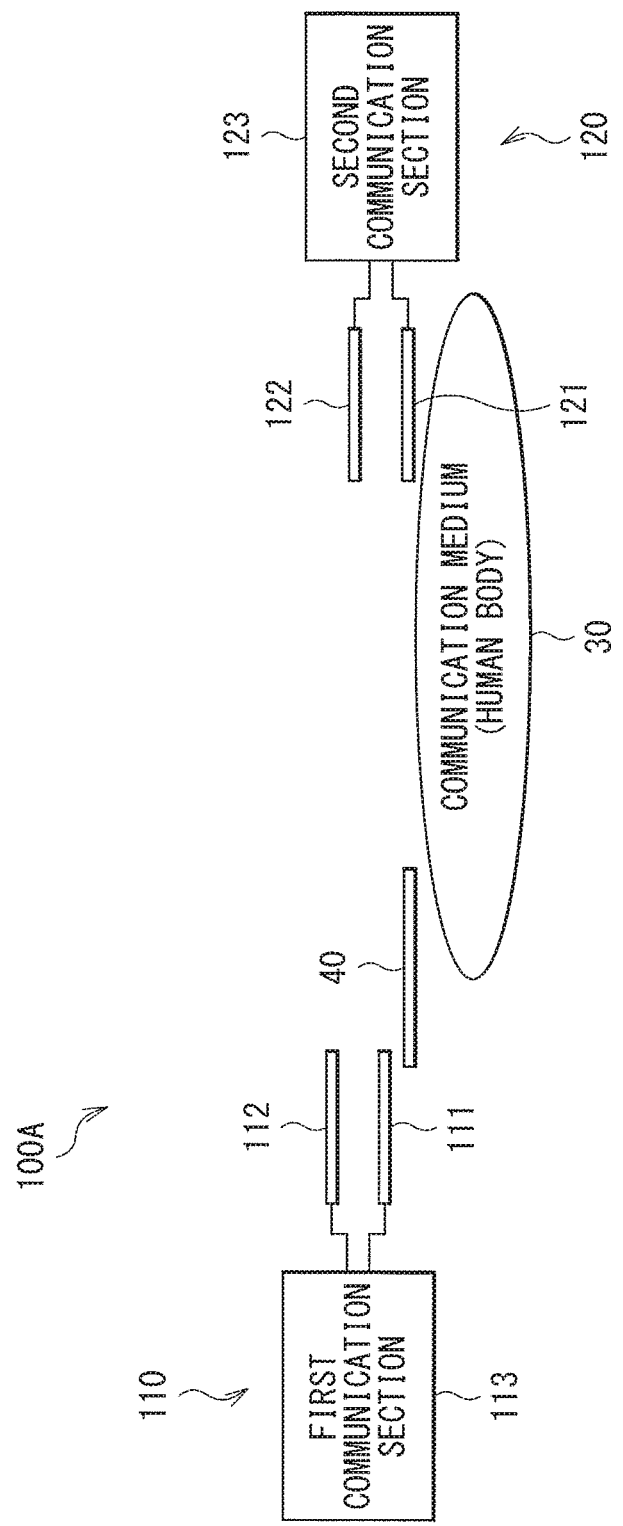

[ FIG. 16 ]
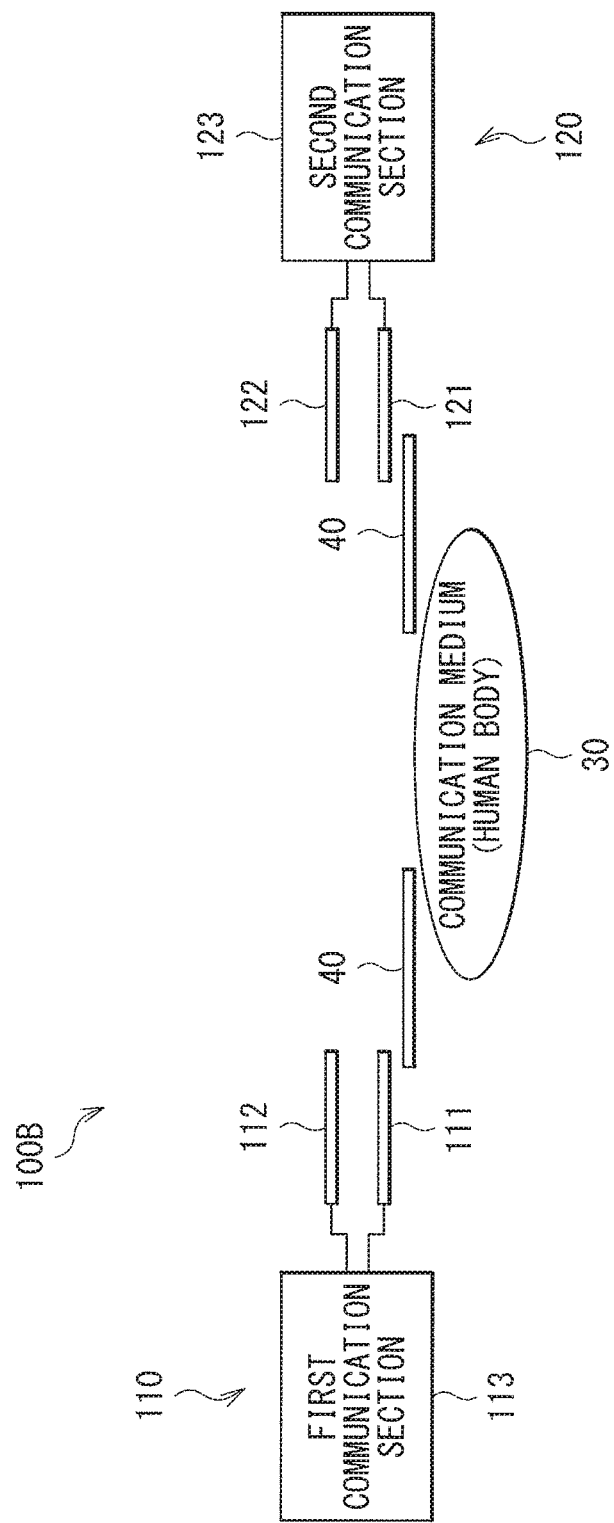

COMMUNICATION UNIT AND COMMUNICATION SYSTEM

TECHNICAL FIELD

The disclosure relates to a communication unit and a communication system that are suitable for quasi-electrostatic field communication.

BACKGROUND ART

As a communication system including a transmission unit, a communication medium, and a reception unit, in particular, a communication technique using a human body as a communication medium is called quasi-electrostatic field communication. In the quasi-electrostatic field communication, a user wears a transmission unit including a human-body-side transmission electrode and a space-side transmission electrode. The reception unit includes a human-body-side reception electrode and a space-side reception electrode. The human-body-side reception electrode receives a signal from the human-body-side transmission electrode through a communication path using a human body as a communication medium. The space-side reception electrode receives a signal through a communication path using a space as a communication medium. In the quasi-electrostatic field communication, only a user's touch on the reception electrode allows for communication. Utilization of the quasi-electrostatic field communication is expected, for example, in the field of security where door unlocking, etc. is performed.

CITATION LIST

Patent Literature

PTL 1: Japanese Unexamined Patent Application Publication No. 2012-235092

SUMMARY OF THE INVENTION

In the quasi-electrostatic field communication, a space electrode and a human-body electrode each have a shape that influences transmission performance and load impedance of a communication circuit. For this reason, a degree of freedom in design of the electrode is limited.

It is desirable to provide a communication unit and a communication system that make it possible to increase a degree of freedom in design of a space electrode and a human-body electrode.

A communication unit according to an embodiment of the disclosure includes: a human-body electrode and a space electrode that perform communication through a human body by means of an electric field method; and a first auxiliary conductor section that includes a first end and a second end, the first end causing electrostatic induction corresponding to a transmission signal with respect to the human body, the second end being disposed at a position closer to the human-body electrode than to the space electrode.

A communication system according to an embodiment of the disclosure includes: a first communication unit; and a second communication unit that communicates with the first communication unit through a human body. One or both of the first communication unit and the second communication unit include a human-body electrode and a space electrode that perform communication through the human body by means of an electric field method, and a first auxiliary conductor section that includes a first end and a second end, the first end causing electrostatic induction corresponding to a transmission signal with respect to the human body, the second end being disposed at a position closer to the human-body electrode than to the space electrode.

In the communication unit or the communication system according to the embodiment of the disclosure, the communication through the human body is performed by means of the electric field method.

According to the communication unit or the communication system in the embodiment of the disclosure, there is disposed the first auxiliary conductor section that includes the first end causing electrostatic induction corresponding to a transmission signal with respect to the human body, and the second end being disposed at a position closer to the human-body electrode than to the space electrode. This makes it possible to increase a degree of freedom in design of the space electrode and the human-body electrode.

It is to be noted that effects described here are not necessarily limitative, and may be any of effects described in the disclosure.

BRIEF DESCRIPTION OF DRAWINGS

FIG. 1 is a configuration diagram illustrating an outline of a communication system using a human body as a communication medium.

FIG. 2 illustrates a configuration example of a communication system according to a comparative example of a first embodiment of the disclosure.

FIG. 3 illustrates a configuration example of a communication system according to the first embodiment.

FIG. 4 illustrates a first specific configuration example of an auxiliary conductor section.

FIG. 5 illustrates a second specific configuration example of the auxiliary conductor section.

FIG. 6 illustrates a third specific configuration example of the auxiliary conductor section.

FIG. 7 illustrates a fourth specific configuration example of the auxiliary conductor section.

FIG. 8 illustrates a fifth specific configuration example of the auxiliary conductor section.

FIG. 9 illustrates the fifth specific configuration example of the auxiliary conductor section.

FIG. 10 illustrates a sixth specific configuration example of the auxiliary conductor section.

FIG. 11 illustrates a seventh specific configuration example of the auxiliary conductor section.

FIG. 12 illustrates an eighth specific configuration example of the auxiliary conductor section.

FIG. 13 illustrates a ninth specific configuration example of the auxiliary conductor section.

FIG. 14 illustrates a tenth specific configuration example of the auxiliary conductor section.

FIG. 15 illustrates a configuration example of a communication system according to a first modification example of the first embodiment.

FIG. 16 illustrates a configuration example of a communication system according to a second modification example of the first embodiment.

MODES FOR CARRYING OUT THE INVENTION

Some embodiments of the disclosure are described below in detail with reference to the drawings. It is to be noted that the description is given in the following order.

1. First Embodiment
   1.1 Outline of Communication System Using Human Body as Communication Medium (FIG. 1)
   1.2 Comparative Example (FIG. 2)
   1.3 Basic Configuration of Communication System According to First Embodiment (FIG. 3)
   1.4 Specific Configuration Example of Auxiliary Conductor Section (FIG. 4 to FIG. 14)
   1.5 Effects
   1.6 Modification Examples of First Embodiment (FIG. 15 and FIG. 16)
2. Other Embodiments

1. First Embodiment

1.1 Outline of Communication System Using Human Body as Communication Medium FIG. 1 illustrates an outline of a communication system 100 that performs communication using a human body as a communication medium by means of an electric field method (a quasi-electrostatic field communication method).

The communication system 100 includes a first communication unit 110 and a second communication unit 120.

The first communication unit 110 includes a first human-body electrode 111, a first space electrode 112, and a first communication section 113. The first communication section 113 includes a communication circuit using the quasi-electrostatic field communication method.

The second communication unit 120 includes a second human-body electrode 121, a second space electrode 122, and a second communication section 123. The second communication section 123 includes a communication circuit using the quasi-electrostatic field communication method.

In a case where a signal is transmitted from the first communication unit 110, an input signal Sin to be a source of a transmission signal is inputted into the first communication section 113. The first communication section 113 generates, between the first human-body electrode 111 and the first space electrode 112, a transmission signal of a potential difference V1 including a signal modulated in a predetermined modulation scheme. The first human-body electrode 111 is disposed on side closer to the human body than the first space electrode 112. The first human-body electrode 111 is thereby disposed to have stronger capacitive coupling with respect to a communication medium 30 than the first space electrode 112.

In this communication system 100, a human-body-side communication path using the human body as the communication medium 30 is formed between the first human-body electrode 111 and the second human-body electrode 121, by bringing a portion of the human body closer to the second human-body electrode 121 than to the second space electrode 122. Further, a space-side communication path using a space (e.g., air) as a communication medium is formed between the first space electrode 112 and the second space electrode 122.

A potential difference V2 corresponding to a transmission signal transmitted through the communication medium 30 is generated between the second human-body electrode 121 and the second space electrode 122. The second communication section 123 detects the potential difference V2 generated between the second human-body electrode 121 and the second space electrode 122, performs demodulation processing corresponding to the modulation scheme of the first communication section 113 to have a received signal, and outputs the received signal as an output signal Sout.

In the communication system 100, typically, the larger the electrode of each section is, the better the transmission property is, but there is an influence of waveform distortion due to a frequency property of a load impedance viewed from the communication circuit. In the communication system 100, it is difficult to separately design the transmission property and the load impedance.

1.2 Comparative Example

FIG. 2 schematically illustrates a configuration example of a communication system according to a comparative example of a first embodiment of the disclosure.

The communication system according to the comparative example represents a configuration example in which, in the foregoing communication system 100, the first communication unit 110 is employed as a transmission unit 10, and the second communication unit 120 is employed as a reception unit 20.

The transmission unit 10 includes a human-body-side transmission electrode 11 corresponding to the foregoing first human-body electrode 111, a space-side transmission electrode 12 corresponding to the foregoing first space electrode 112, and a transmitter 13 corresponding to the foregoing first communication section 113.

The reception unit 20 includes a human-body-side reception electrode 21 corresponding to the foregoing second human-body electrode 121, a space-side reception electrode 22 corresponding to the foregoing second space electrode 122, and a reception amplifier 23 and a demodulation processor 24 corresponding to the foregoing second communication section 123.

The human-body-side transmission electrode 11 is disposed on side closer to the human body than the space-side transmission electrode 12. The human-body-side transmission electrode 11 is thereby disposed to have stronger capacitive coupling with respect to the communication medium 30 than the space-side transmission electrode 12.

The input signal Sin to be a source of a transmission signal is inputted into the transmitter 13. The transmitter 13 generates, between the human-body-side transmission electrode 11 and the space-side transmission electrode 12, a transmission signal of the potential difference V1 including a signal modulated in a predetermined modulation scheme. For example, the transmitter 13 generates, between the human-body-side transmission electrode 11 and the space-side transmission electrode 12, a varying voltage of data obtained by Manchester encoding. The space-side transmission electrode 12 generates a space electric field corresponding to the varying voltage. The human-body-side transmission electrode 11 and the space-side transmission electrode 12 generate an electric field around the human body. A variation in the generated electric field causes bias of an electric charge due to electrostatic induction on the human body.

Bringing a portion of the human body closer to the human-body-side reception electrode 21 than to the space-side reception electrode 22 causes electrostatic induction between the human body and the human-body-side reception electrode 21, thereby causing a voltage variation between the human-body-side reception electrode 21 and the space-side reception electrode 22. A human-body-side communication path using the human body as the communication medium 30 is formed between the human-body-side transmission electrode 11 and the human-body-side reception electrode 21. Further, a space-side communication path using a space (e.g., air) as a communication medium is formed between the space-side transmission electrode 12 and the space-side reception electrode 22.

The potential difference V2 corresponding to a transmission signal transmitted through the communication medium 30 is generated between the human-body-side reception electrode 21 and the space-side reception electrode 22. The reception amplifier 23 detects the potential difference V2 generated between the human-body-side reception electrode 21 and the space-side reception electrode 22, and amplifies the detected potential difference V2 as a received signal. In the demodulation processor 24, the received signal is subjected to demodulation processing corresponding to the modulation scheme of the transmitter 13, and then outputs the received signal as the output signal Sout. For example, in the demodulation processor 24, demodulation processing by means of the Manchester encoding is performed.

In this communication system according to the comparative example, an electrode shape of each section in the transmission unit 10 and the reception unit 20 determines transmission performance. At the same time, the electrode shape determines load impedance of a communication circuit using the quasi-electrostatic field communication method in the transmission unit 10 and the reception unit 20. For example, it is known that the larger an area of a reception electrode is, the greater intensity of a received signal is. However, in a case of a parallel plate electrode, an increase in the area of the electrode leads to an increase in capacitance, thereby causing a reception frequency property to be determined. This also holds true for a case of a transmission electrode.

When the human body directly touches the human-body-side reception electrode 21, the load impedance varies and influences the frequency property of the communication circuit, in some cases. It is possible to enhance communication performance by increasing the electrode area, but communication not intended by a user may be enabled by a space electric field, in some cases, even when there is no touch to the human body. It is possible to obtain a degree of freedom in electrode layout by extending a wiring line to an electrode, but two wire rods are necessary. In this case, inductance of the wire rods is also an issue; however, when thick wire rods are used to lower the inductance, capacitance between the two wire rods influences a communication property. In addition, for example, in a case where the human-body-side reception electrode 21 is added to a doorknob, the doorknob forms one of electrodes, thus causing the doorknob to be a determinant of a transmission property and a load impedance, thereby decreasing a degree of freedom in design.

1.3 Basic Configuration of Communication System According to First Embodiment FIG. 3 schematically illustrates a configuration example of a communication system according to the first embodiment of the disclosure.

It is to be noted that, in the following, the same components as those of the communication system according to the comparative example in FIG. 2 are denoted by the same reference numerals, and the descriptions thereof are omitted as appropriate.

The communication system according to the present embodiment further includes an auxiliary conductor section 40, in addition to the configuration of the communication system according to the foregoing comparative example.

The auxiliary conductor section 40 includes a first end 41 and a second end 42. The first end 41 causes electrostatic induction corresponding to a transmission signal with respect to the human body. The second end 42 is disposed at a position closer to the human-body-side reception electrode 21 than to the space-side reception electrode 22.

In a case where the first end 41 is in contact with or in proximity to the human body, the auxiliary conductor section 40 causes, between the human-body-side reception electrode 21 and the space-side reception electrode 22, an electric field variation corresponding to a transmission signal.

In the communication system according to the present embodiment, as illustrated in FIG. 3, when the first end 41 of the auxiliary conductor section 40 is brought closer to the human body, bias of an electric charge occurs due to the electrostatic induction in the first end 41 and the second end 42 as well, in accordance with an electric charge due to electrostatic induction that occurs on the human body. An electric line of force is generated by the electric charge in the second end 42 intersects the human-body-side reception electrode 21 and the space-side reception electrode 22. This causes a voltage variation between the human-body-side reception electrode 21 and the space-side reception electrode 22. As a result, a human-body-side communication path using the human body as the communication medium 30 through the auxiliary conductor section 40 is formed between the human-body-side transmission electrode 11 and the human-body-side reception electrode 21.

Other configurations may be substantially similar to those of the communication system according to the foregoing comparative example.

1.4 Specific Configuration Example of Auxiliary Conductor Section

FIG. 4 to FIG. 7 illustrate, respectively, specific first to fourth configuration examples of the auxiliary conductor section 40.

It is desirable that the second end 42 of the auxiliary conductor section 40 have a structure that concentrates an electric field on the human-body-side reception electrode 21. For example, it is desirable for the second end 42 to have a conductor shape that becomes sharper as being closer to the human-body-side reception electrode 21, as illustrated in FIG. 4. The second end 42 is made sharper as being closer to the human-body-side reception electrode 21, thereby allowing the electric field to be easily concentrated on the human-body-side reception electrode 21. Assuming that an electric field between the human-body-side reception electrode 21 and the space-side reception electrode 22 is E and that a spacing between the human-body-side reception electrode 21 and the space-side reception electrode 22 is d, a potential difference between the human-body-side reception electrode 21 and the space-side reception electrode 22 is expressed as V=Ed. It is possible to make the potential difference V larger, by concentrating the electric field E. It is to be noted that the electric field E is determined by an expression illustrated in FIG. 4, where Q is an electric charge, and $\varepsilon_0$ is a dielectric constant in a vacuum.

In the example illustrated in FIG. 4, the first end 41 has a flat shape to be easily brought into contact with the human body such as a finger 60. Further, the second end 42 has a flat triangular shape, and is disposed, with an apex of the triangular shape toward a middle part of the human-body-side reception electrode 21. Furthermore, in the example illustrated in FIG. 4, the second end 42 having the flat shape is disposed to be substantially orthogonal to the human-body-side reception electrode 21. Moreover, for example, as illustrated in FIG. 5, there may be provided a structure in which the second end 42 is divided into a first part 42A and a second part 42B, with the second part 42B being disposed on side opposite to the human-body-side reception electrode 21, and the human-body-side reception electrode 21 and the space-side reception electrode 22 are interposed between the first part 42A and the second part 42B. In this case, it is desirable that, for example, the first part 42A and the second part 42B each have a triangular shape and are disposed to allow an apex of the first part 42A and an apex of the second part 42B to face each other.

The shape of the second end 42 is not limited to the flat shape, and may be, for example, a conical shape or a shape of quadrangular pyramid. Further, the shape of the second end 42 may be, for example, a shape of sphere as illustrated in FIG. 6. In this case, the sphere may be coupled to the first end 41 by using a linear conductor. Further, in this case, it is desirable that the sphere be disposed to be positioned at the middle part of the human-body-side reception electrode 21.

Further, for example, as illustrated in FIG. 7, the second end 42 may be configured by a linear conductor. In this case, it is desirable that the linear conductor is disposed to cross the middle part of the human-body-side reception electrode 21.

FIG. 8 and FIG. 9 each illustrate a fifth specific configuration example of the auxiliary conductor section 40. The first end 41 may have a structure attachable to a doorknob 51 on a door 50. FIG. 8 illustrates a state before the first end 41 is attached to the doorknob 51, and FIG. 9 illustrates a state where the first end 41 is attached to the doorknob 51. The doorknob 51 may be of metal, or may be grounded.

As illustrated in FIG. 8 and FIG. 9, the first end 41 may have a cylindrical structure attachable to the doorknob 51. In the example in each of FIG. 8 and FIG. 9, the first end 41 has a cylindrical shape to cover a circumference of the doorknob 51, but may have a cap-like shape to cover the entire doorknob 51. In a case where the first end 41 has the cylindrical shape or cap-like shape, a surface forms a part to be in contact with the human body, but may be configured to be insulated or to have electroconductivity. When the doorknob 51 is of metal, an electric charge generated in the first end 41 may diffuse even to the doorknob 51. For this reason, it is desirable that an insulating section 45 be provided on an inner surface of the first end 41 to have a state where the surface is insulated from the doorknob 51.

The first end 41 may be coupled to the second end 42 by using a linear conductor. In FIG. 8 and FIG. 9, the shape of the second end 42 is also linear, but the second end 42 may have a structure as illustrated above in each of FIG. 4 to FIG. 6.

It is to be noted that FIG. 8 and FIG. 9 illustrate the example in which the first end 41 has the cylindrical shape to match a column shape of the doorknob 51, but the shape of the doorknob 51 may be other than the column shape. In this case, the first end 41 may appropriately have a shape to cover the doorknob 51 entirely or partially to match the shape of the doorknob 51.

Further, in a case where the first end 41 has the shape to cover the doorknob 51 partially, the first end 41 may have a shape that resembles a portion of the human body to allow a user of the communication system to touch the first end 41 easily. For example, as illustrated in a sixth configuration example in FIG. 10, the first end 41 may be configured to have a shape that resembles at least a shape of the finger 60, etc. of the human body, and to have a structure that fits the finger 60, etc.

FIG. 11 illustrates a seventh specific configuration example of the auxiliary conductor section.

As illustrated in FIG. 11, the auxiliary conductor section 40 may have a structure in which, in a case where the first end 41 comes into contact with the human body, the second end 42 approaches the human-body-side reception electrode 21. For example, there may be provided a structure in which a distance between the second end 42 and the human-body-side reception electrode 21 is reduced by pressing the first end 41 with the finger 60, etc. In this case, the distance may be reduced to form some spacing 46 between the second end 42 and the human-body-side reception electrode 21, or may be reduced until the second end 42 comes in complete contact with the human-body-side reception electrode 21.

FIG. 12 illustrates an eighth specific configuration example of the auxiliary conductor section.

As illustrated in FIG. 12, the auxiliary conductor section 40 may further include a switch 71. The reception unit 20 may further include a switching controller 72 that controls the switch 71. The switching controller 72 may include a touch sensor 73.

The switch 71 is provided between the first end 41 and the second end 42, and switches a conducting state of the first end 41 and the second end 42. The switching controller 72 enables the touch sensor 73 to detect contact of the human body with the first end 41. When the human body comes into contact with the first end 41, the switching controller 72 causes the switch 71 to bring the first end 41 and the second end 42 into electrical conduction.

FIG. 13 illustrates a ninth specific configuration example of the auxiliary conductor section.

As illustrated in FIG. 13, the auxiliary conductor section 40 may further include an inductor 74 in addition to the eighth configuration example in FIG. 12. The inductor 74 may be provided in parallel with the switch 71, between the first end 41 and the second end 42. In this case, an LC resonance circuit is configured by a parasitic capacitance C between the first end 41 and the second end 42, and by the inductor 74. On/off operation of the switch 71 may be thereby performed more reliably.

FIG. 14 illustrates a tenth specific configuration example of the auxiliary conductor section.

For example, as illustrated in FIG. 14, the auxiliary conductor section 40 having the foregoing structure illustrated in FIG. 8 and FIG. 9 may be applied to each of an inner doorknob 51A and an outer doorknob 51B of the door 50. It is to be noted that the inner doorknob 51A and the outer doorknob 51B are insulated from each other.

The auxiliary conductor section 40 described above may be attached to the inner doorknob 51A, as a first auxiliary conductor section 40A. In addition, a second auxiliary conductor section 40B may be attached to the outer doorknob 51B. The second auxiliary conductor section 40B includes a third end 43 that causes electrostatic induction corresponding to a transmission signal with respect to the human body, and a fourth end 44 disposed at a position closer to the space-side reception electrode 22 than to the human-body-side reception electrode 21. The third end 43 may have a structure such as a cylindrical shape that is substantially similar to that of the first end 41 illustrated in FIG. 8 and FIG. 9.

The reception unit 20 may further include a determiner 25 that determines which one of the first end 41 of the first auxiliary conductor section 40A and the third end 43 of the second auxiliary conductor section 40B is in contact with the human body.

When the tenth configuration example in FIG. 14 is adopted, there is a difference in direction of an electric field passing through the human-body-side reception electrode 21 and the space-side reception electrode 22, between a case where the user touches the inner doorknob 51A and a case where the user touches the outer doorknob 51B. The polarity of the received signal is thereby reversed between the case where the user touches the inner doorknob 51A and the case where the user touches the outer doorknob 51B. In other words, in the case where the user touches the outer doorknob 51B (the third end 43), a role of the human-body-side reception electrode 21 and a role of the space-side reception electrode 22 are reversed. The human-body-side reception electrode 21 serves as the space-side reception electrode 22, and the space-side reception electrode 22 serves as the human-body-side reception electrode 21. It is possible for the determiner 25 to determine which one of the first end 41 and the third end 43 is in contact with the human body, i.e., which one of the inner doorknob 51A and the outer doorknob 51B is in contact with the user, by detecting the polarity of the received signal.

1.5 Effects

As described above, according to the present embodiment, there is disposed the auxiliary conductor section 40 including the first end 41 that causes the electrostatic induction corresponding to a transmission signal with respect to the human body, and the second end 42 disposed at the position closer to the human-body-side reception electrode 21 than to the space-side reception electrode 22. This makes it possible to increase a degree of freedom in design of the space-side reception electrode 22 and the human-body-side reception electrode 21.

According to the present embodiment, it is possible to perform electrode design that determines load impedance for the communication circuit and design of a signal transmission property, relatively independently of each other. It is also possible to perform shape design of a part to be touched by the human body in the auxiliary conductor section 40, independently of the electrode design. An electrode shape determines the load impedance of the communication circuit, and this determination determines a signal waveform, etc. According to the present embodiment, placing the auxiliary conductor section 40 makes it possible to perform the electrode design relatively independently of the design of the signal transmission property.

According to the present embodiment, it is possible to enhance a transmission property such as an increase in field intensity by designing the shape of an end of the auxiliary conductor section 40 independently of the electrode design. In existing techniques, two wire rods are routed in a case where an electrode wiring line is extended; however, according to the present embodiment, it is possible to configure the auxiliary conductor section 40 only by one wire rod. According to the present embodiment, there is provided the structure in which the human-body-side reception electrode 21 is not to be directly touched by the human body. This makes it possible to suppress a variation in the load impedance of the communication circuit to be small. In addition, according to the present embodiment, a degree of freedom in the electrode layout increases, thus making it possible to perform relatively long-distance signal transmission.

In particular, according to the configuration example in each of FIG. 8 and FIG. 9, it is not necessary to provide the doorknob 51 made of metal as an electrode, thus making it easier to design enhanced transmission performance.

In particular, according to the configuration example in FIG. 11, it is possible not to allow signal transmission without a press by the finger 60, etc. This makes it possible to address a so-called "unnecessary transmission" communication in which transmission is enabled only by approach.

In particular, according to the configuration example in each of FIG. 12 and FIG. 13, it is possible not to allow signal transmission unless the switch 71 is turned on, because of the inserted switch 71. This makes it possible to address the so-called "unnecessary transmission" communication in which transmission is enabled only by approach.

It is to be noted that the effects described herein are merely illustrative and not limitative, and may have other effects. This also holds true for effects of the following other embodiments.

1.6 Modification Examples of First Embodiment

FIG. 15 and FIG. 16 each schematically illustrate a configuration example of a communication system according to a modification example of the first embodiment.

The foregoing description exemplifies the case where, in the communication system 100 illustrated in FIG. 1, the first communication unit 110 is employed as the transmission unit 10 and the second communication unit 120 is employed as the reception unit 20. However, the first communication unit 110 may be employed as the reception unit 20 and the second communication unit 120 may be employed as the transmission unit 10. Further, the first communication unit 110 may be a communication unit that performs both transmission and reception. Similarly, the second communication unit 120 may be a communication unit that performs both transmission and reception.

Furthermore, the auxiliary conductor section 40 may be disposed in the transmission unit 10, instead of being disposed in the reception unit 20. Alternatively, the auxiliary conductor section 40 may be disposed in both of the reception unit 20 and the transmission unit 10.

Moreover, the auxiliary conductor section 40 may be disposed in one or both of the first communication unit 110 and the second communication unit 120. For example, as represented by a communication system 100A of a first modification example illustrated in FIG. 15, the auxiliary conductor section 40 may be disposed in the first communication unit 110. Alternatively, as represented by a communication system 100B of a second modification example illustrated in FIG. 16, the auxiliary conductor section 40 may be disposed in both of the first communication unit 110 and the second communication unit 120.

2. Other Embodiments

The technology according to the disclosure is not limited to the description of the foregoing embodiments, and may be modified in a variety of ways.

For example, the technology may have the following configurations.

(1) A communication unit including:
   a human-body electrode and a space electrode that perform communication through a human body by means of an electric field method; and
   a first auxiliary conductor section that includes a first end and a second end, the first end causing electrostatic induction corresponding to a transmission signal with respect to the human body, the second end being disposed at a position closer to the human-body electrode than to the space electrode.

(2) The communication unit according to (1), in which, in a case where the first end is in contact with or in proximity to the human body, the first auxiliary conductor section causes an electric field variation corresponding to the transmission signal between the human-body electrode and the space electrode.
(3) The communication unit according to (1) or (2), in which the second end has a structure that concentrates an electric field on the human-body electrode.
(4) The communication unit according to (3), in which the second end has a shape that becomes sharper as being closer to the human-body electrode.
(5) The communication unit according to any one of (1) to (4), in which the first end has a structure attachable to a doorknob.
(6) The communication unit according to (5), in which
the first end includes
a surface having electroconductivity, and provided to be in contact with the human body, and
an inner surface insulated from the doorknob.
(7) The communication unit according to (5), in which
the first end includes
a surface insulated, and provided to be in contact with the human body, and
an inner surface insulated from the doorknob.
(8) The communication unit according to any one of (1) to (7), in which the first end includes a surface having a shape that resembles a shape of a portion of the human body.
(9) The communication unit according to (8), in which the first end has a shape that resembles at least a shape of a finger of the human body.
(10) The communication unit according to any one of (1) to (9), in which the first auxiliary conductor section has a structure in which the second end approaches the human-body electrode in a case where the first end comes into contact with the human body.
(11) The communication unit according to any one of (1) to (10), in which the first auxiliary conductor section further includes a switch provided between the first end and the second end, and switching a conducting state of the first end and the second end.
(12) The communication unit according to (11), further including a switching controller that that controls the switch and causes the first end and the second end to conduct with each other in a case where the human body comes into contact with the first end.
(13) The communication unit according to (11) or (11), in which the first auxiliary conductor section further includes an inductor provided in parallel with the switch, between the first end and the second end.
(14) The communication unit according to any one of (1) to (13), further including a second auxiliary conductor section that includes a third end and a fourth end, the third end causing electrostatic induction corresponding to a transmission signal with respect to the human body, the fourth end being disposed at a position closer to the space electrode than to the human-body electrode.
(15) The communication unit according to (14), further including a determiner that determines which one of the first end and the third end is in contact with the human body.
(16) A communication system including:
a first communication unit; and
a second communication unit that communicates with the first communication unit through a human body,
one or both of the first communication unit and the second communication unit including a human-body electrode and a space electrode that perform communication through the human body by means of an electric field method, and
a first auxiliary conductor section that includes a first end and a second end, the first end causing electrostatic induction corresponding to a transmission signal with respect to the human body, the second end being disposed at a position closer to the human-body electrode than to the space electrode.

This application claims the benefit of Japanese Priority Patent Application JP2016-070487 filed with the Japan Patent Office on Mar. 31, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof

The invention claimed is:

1. A communication unit comprising:
a human-body electrode and a space electrode that perform communication through a human body by means of an electric field method; and
a first auxiliary conductor section that includes a first end and a second end, the first end causing electrostatic induction corresponding to a transmission signal with respect to the human body, the second end being disposed at a position closer to the human-body electrode than to the space electrode,
wherein the first auxiliary conductor section has a structure in which the second end approaches the human-body electrode in a case where the first end comes into contact with the human body.

2. The communication unit according to claim 1, wherein, in a case where the first end is in contact with or in proximity to the human body, the first auxiliary conductor section causes an electric field variation corresponding to the transmission signal between the human-body electrode and the space electrode.

3. The communication unit according to claim 1, wherein the second end has a structure that concentrates an electric field on the human-body electrode.

4. The communication unit according to claim 3, wherein the second end has a shape that becomes sharper as being closer to the human-body electrode.

5. The communication unit according to claim 1, wherein the first end has a structure attachable to a doorknob.

6. The communication unit according to claim 5, wherein
the first end includes
a surface having electroconductivity, and provided to be in contact with the human body, and
an inner surface insulated from the doorknob.

7. The communication unit according to claim 5, wherein
the first end includes
a surface insulated, and provided to be in contact with the human body, and
an inner surface insulated from the doorknob.

8. The communication unit according to claim 1, wherein the first end includes a surface having a shape that resembles a shape of a portion of the human body.

9. The communication unit according to claim 8, wherein the first end has a shape that resembles at least a shape of a finger of the human body.

10. A communication unit comprising:
a human-body electrode and a space electrode that perform communication through a human body by means of an electric field method; and a first auxiliary conductor section that includes a first end and a second end, the first end causing electrostatic induction corresponding to a transmission signal with respect to the human body, the second end being disposed at a position closer to the human-body electrode than to the space electrode, wherein the first auxiliary conductor section further includes a switch provided between the first end and the second end, and switching a conducting state of the first end and the second end.

11. The communication unit according to claim 10, further comprising a switching controller that controls the switch and causes the first end and the second end to conduct with each other in a case where the human body comes into contact with the first end.

12. The communication unit according to claim 10, wherein the first auxiliary conductor section further includes an inductor provided in parallel with the switch, between the first end and the second end.

13. A communication unit comprising:
- a human-body electrode and a space electrode that perform communication through a human body by means of an electric field method;
- a first auxiliary conductor section that includes a first end and a second end, the first end causing electrostatic induction corresponding to a transmission signal with respect to the human body, the second end being disposed at a position closer to the human-body electrode than to the space electrode; and
- a second auxiliary conductor section that includes a third end and a fourth end, the third end causing electrostatic induction corresponding to a transmission signal with respect to the human body, the fourth end being disposed at a position closer to the space electrode than to the human-body electrode.

14. The communication unit according to claim 13, further comprising a determiner that determines which one of the first end and the third end is in contact with the human body.

15. A communication system comprising:
- a first communication unit; and
- a second communication unit that communicates with the first communication unit through a human body,
- wherein one or both of the first communication unit and the second communication unit including the communication unit according to claim 13.

16. A communication system comprising:
- a first communication unit; and
- a second communication unit that communicates with the first communication unit through a human body,
- wherein one or both of the first communication unit and the second communication unit including the communication unit according to claim 1.

17. A communication system comprising:
- a first communication unit; and
- a second communication unit that communicates with the first communication unit through a human body,
- wherein one or both of the first communication unit and the second communication unit including the communication unit according to claim 10.

* * * * *